(12) United States Patent
Zhou et al.

(10) Patent No.: US 7,786,974 B2
(45) Date of Patent: Aug. 31, 2010

(54) DRIVING A BI-STABLE MATRIX DISPLAY DEVICE

(75) Inventors: Guofu Zhou, Einhoven (NL); Neculai Ailenei, Eindhoven (NL); Mark Thomas Johnson, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 1438 days.

(21) Appl. No.: 10/543,201

(22) PCT Filed: Jan. 13, 2004

(86) PCT No.: PCT/IB2004/050014

§ 371 (c)(1),
(2), (4) Date: Jul. 22, 2005

(87) PCT Pub. No.: WO2004/066256

PCT Pub. Date: Aug. 5, 2004

(65) Prior Publication Data

US 2006/0139305 A1    Jun. 29, 2006

(30) Foreign Application Priority Data

Jan. 23, 2003  (EP) .................... 03100133
Jul. 14, 2003  (EP) .................... 03102135

(51) Int. Cl.
*G09G 3/34*    (2006.01)
(52) U.S. Cl. ........................ 345/107; 345/95
(58) Field of Classification Search ............. 345/107, 345/95, 94, 204; 359/296
See application file for complete search history.

(56) References Cited

U.S. PATENT DOCUMENTS

| 5,961,804 | A | 10/1999 | Jacobson et al. |
| 6,120,839 | A | 9/2000 | Comiskey et al. |
| 6,130,774 | A | 10/2000 | Albert et al. |
| 6,236,385 | B1 * | 5/2001 | Nomura et al. ............... 345/95 |
| 6,504,524 | B1 | 1/2003 | Gates et al. |
| 6,531,997 | B1 * | 3/2003 | Gates et al. ................. 345/107 |
| 6,762,744 | B2 * | 7/2004 | Katase ....................... 345/107 |
| 2002/0005832 | A1 * | 1/2002 | Katase ....................... 345/107 |
| 2002/0063674 | A1 | 5/2002 | Inoue et al. |
| 2003/0011869 | A1 | 1/2003 | Matsuda et al. |

FOREIGN PATENT DOCUMENTS

| EP | 1146502 A2 | 10/2001 |
| WO | 9953373 A1 | 10/1999 |
| WO | 2004034366 A1 | 4/2004 |

* cited by examiner

*Primary Examiner*—Amare Mengistu
*Assistant Examiner*—Yuk Chow

(57) ABSTRACT

In a first display mode, only the information in a first sub-area (W1) of the display screen of a bi-stable matrix display (100) has to be updated. In a second display mode, the information in a second sub-area (W2) of the display screen has to be updated. The information in the first sub-area (W1) is displayed using optical states which require first drive voltage waveforms (DV1) having a maximum duration equal to a first image update period (IUP1). The information in the second area (W2) is displayed using optical states which require second drive voltage waveforms (DV2) having a maximum duration equal to a second image update period (IUP2). The optical states allowed to be used during the first mode are selected to obtain a first image update period (IUP1) which is shorter than the second image update period (IUP2). In this manner, the refresh rate of the information in the first area (W1) is higher than the refresh rate in the second area (W2).

17 Claims, 6 Drawing Sheets

DRIVING A BI-STABLE MATRIX DISPLAY DEVICE

Figure 1:
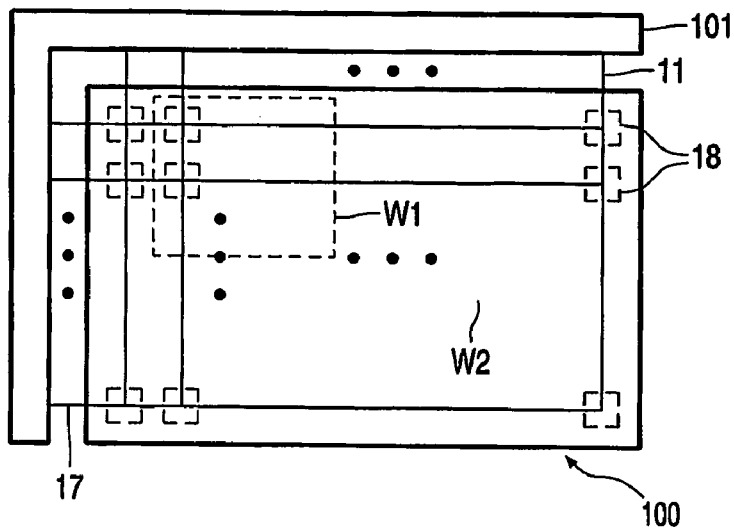

The invention relates to a drive circuit for driving a bi-stable matrix display device, to a display apparatus comprising a bi-stable matrix display device and such a drive circuit, and to a method of driving a bi-stable matrix display device.

Bi-stable matrix display devices, such as, for example, electrophoretic displays are used in, for example, electronic books, mobile telephones, personal digital assistants, laptop computers, and monitors.

An electrophoretic display device is known from international patent application WO 99/53373. This patent application discloses an electronic ink display which comprises two substrates, one of which is transparent, the other substrate is provided with electrodes arranged in rows and columns. Display elements or pixels are associated with intersections of the row and column electrodes. Each display element is coupled to the column electrode via a main electrode of a thin-film transistor (further referred to as TFT). A gate of the TFT is coupled to the row electrode. This arrangement of display elements, TFT's and row and column electrodes jointly forms an active matrix display device.

Each pixel comprises a pixel electrode which is the electrode of the pixel which is connected via the TFT to the column electrodes. During an image update period or image refresh period, a row driver is controlled to select all the rows of display elements one by one, and the column driver is controlled to supply data signals in parallel to the selected row of display elements via the column electrodes and the TFT's. The data signals correspond to image data to be displayed.

Furthermore, an electronic ink is provided between the pixel electrode and a common electrode provided on the transparent substrate. The electronic ink is thus sandwiched between the common electrode and the pixel electrodes. The electronic ink comprises multiple microcapsules of about 10 to 50 microns. Each microcapsule comprises positively charged white particles and negatively charged black particles suspended in a fluid. When a positive voltage is applied to the pixel electrode with respect to the common electrode, the white particles move to the side of the microcapsule directed to the transparent substrate, and the display element appears white to a viewer. Simultaneously, the black particles move to the pixel electrode at the opposite side of the microcapsule where they are hidden from the viewer. By applying a negative voltage to the pixel electrode with respect to the common electrode, the black particles move to the common electrode at the side of the microcapsule directed to the transparent substrate, and the display element appears dark to a viewer. When the electric field is removed, the display device remains in the acquired state and exhibits a bi-stable character. This electronic ink display with its black and white particles is particularly useful as an electronic book.

Grey scales can be created in the display-device by controlling the amount of particles that move to the common electrode at the top of the microcapsules. For example, the energy of the positive or negative electric field, defined as the product of field strength and time of application, controls the amount of particles which move to the top of the microcapsules.

From the non-pre-published patent application in accordance to applicants Ser. No. 10/542,910 which has been filed as European patent application 03100133.2 it is known to minimize the image retention by extending the duration of the reset pulse which is applied before the drive pulse. An over-reset pulse is added to the reset pulse, the over-reset pulse and the reset pulse together, have an energy which is larger than required to bring the pixel into one of two extreme optical states. The duration of the over-reset pulse may depend on the required transition between successive optical states of a pixel. Unless explicitly mentioned, for the sake of simplicity, the term reset pulse may cover both the reset pulse without the over-reset pulse or the combination of the reset pulse and the over-reset pulse. By using the reset pulse, the pixels are first brought into one of two well defined extreme optical states before the drive pulse changes the optical state of the pixel in accordance with the image to be displayed. This improves the accuracy of the grey levels.

For example, if black and white particles are used, the two extreme optical states are black and white. In the extreme state black, the black particles are at a position near to the transparent substrate, in the extreme state white, the white particles are at a position near to the transparent substrate.

The drive pulse has an energy to change the optical state of the pixel to a desired level which may be in-between the two extreme optical states. Also the duration of the drive pulse may depend on the required transition of the optical state.

The non-prepublished patent application Ser. No. 10/542,910 discloses in an embodiment that preset pulses (also referred to as the shaking pulse) precedes the reset pulse. Preferably, the shaking pulse comprises a series of AC-pulses, however, the shaking pulse may comprise a single preset pulse only. Each level (which is one preset pulse) of the shaking pulse has an energy (or a duration if the voltage level is fixed) sufficient to release particles present in one of the extreme positions, but insufficient to enable said particles to reach the other one of the extreme positions. The shaking pulse increases the mobility of the particles such that the reset pulse has an immediate effect. If the shaking pulse comprises more than one preset pulse, each preset pulse has the duration of a level of the shaking pulse. For example, if the shaking pulse has successively a high level, a low level and a high level, this shaking pulse comprises three preset pulses. If the shaking pulse has a single level, only one preset pulse is present.

The non-prepublished patent application Ser. No. 10/507,812, now U.S. Pat. No. 7,126,577 which has been filed as European patent application 02077017.8 is directed to the use of shaking pulses directly preceding the drive pulses.

The complete voltage waveform which has to be presented to a pixel during an image update period is referred to as the drive voltage waveform. The drive voltage waveform usually differs for different optical transitions of the pixels.

In all embodiments, during each image update period a drive voltage waveform is supplied which comprises the same sequence, for example: a reset pulse preceding a drive pulse, or a shaking pulse, a reset pulse and a drive pulse, or a shaking pulse, a reset pulse, a shaking pulse and a drive pulse. As different pixels may have to change to different optical states, and each pixel may change from any optical state to any optical state, the duration of each image update period is determined by the duration of the longest drive voltage waveform.

The driving of the bi-stable display device in accordance with the present invention differs from the driving disclosed in the non-prepublished patent application Ser. No. 10/542,910 which has been filed as European patent application 03100133.2 in that the display has different display modes. In a first display mode, only the information in a first sub-area of the display screen (further referred to as the first area) has to be updated. In a second display mode, the information in a second sub-area of the display (further referred to as the second area) has to be updated. The information in the first area is displayed using optical states which require first drive voltage waveforms having a maximum duration equal to a first image update period. The information in the second area is displayed using optical states which require second drive voltage waveforms having a maximum duration equal to a second image update period. The optical states allowed to be used during the first mode are selected to obtain a first image update period which is shorter than the second image update period. In this manner, the refresh rate of the information in the first area is higher than the refresh rate in the second area. It is thus possible to refresh the information in the first area at a relatively high rate compared to refreshing the information in the second area or in both the first and the second area. The higher refresh rate in the first area may be important if the information displayed in the first area changes at a higher rate than the refresh rate possible when using the second image update period. An example of an application is a display apparatus which is able to show a relatively slowly changing greyscale image in the second area (the background area) and which displays two level text information in the first area (an window overlaying the background area) which should be updated relatively fast in response to user input.

A first aspect of the invention provides a drive circuit for driving a bi-stable matrix display device as claimed in claim 1. A second aspect of the invention provides a display apparatus as claimed is claim 13. A third aspect of the invention provides a method as claimed in claim 17. Advantageous embodiments are defined in the dependent claims.

In an embodiment in accordance with the invention as defined in claim 2, in the first area the information is displayed by using only the two extreme optical states. The two extreme optical states can be obtained accurately with relatively short drive voltage waveforms which may contain a reset pulse only. The image update period is relatively short and a relatively high refresh rate is possible.

In an embodiment in accordance with the invention as defined in claim 3, in the second area information is displayed which is allowed to obtain optical states in-between the extreme optical states. Now, a grey drive pulse (also referred to as drive pulse) which determines the grey level starting from one of the extreme optical states is required. Thus, the image update time required for the addressing of the second area or both the first and the second area is relatively long.

Preferably, in the second area information is displayed which is allowed to obtain anyone of the possible optical states available for the display, and thus the second image update period must have the maximum duration.

In an embodiment in accordance with the invention as defined in claims 5 or 6 the drive circuit is arranged to drive an electrophoretic display. Such an electrophoretic display may comprise microcapsules which contain at least two types of different particles. The different particles have different optical properties, are charged differently, and/or have different mobility. During the first display mode, the first image update periods comprise a reset pulse only. The reset pulse has an energy sufficient to cause the particles to substantially occupy one of the two extreme positions corresponding to one of the two extreme optical states. During the second display mode, the second image update periods comprising successively at least a reset pulse and a drive pulse, wherein the drive pulse determines the intermediate optical state of a pixel.

Consequently, the first image update period and thus the first refresh time of the first area will be shorter than the second image update period and thus the second refresh time of the second area because the second image update period comprises a drive pulse which is not present in the first image update period. It is thus possible to display black and white information with a relatively high refresh rate in the first area, and to display greyscale information in the second area with a relatively low refresh rate.

In an embodiment in accordance with the invention as defined in claim 7, the drive circuit is arranged for generating a shaking pulse which precedes the reset pulse during the second image update period or during both the first and the second image update period. The use of a shaking pulse preceding the reset pulse is disclosed in the non-pre-published patent application Ser. No. 10/542,910. The shaking pulse comprises at least one preset pulse which has an energy sufficient to release the particles present in one of the two extreme positions corresponding to one of the extreme optical states but insufficient to enable the particles to each the other one of the two extreme positions corresponding the other one of the extreme optical states. The use of the shaking pulse improves the gray level reproduction, and thus is more relevant during the second update period than during the first update period.

In an embodiment in accordance with the invention as defined in claim 8, the drive circuit is arranged for generating during the second display mode further a further shaking pulse occurring in-between the reset pulse and the drive pulse. The use of a shaking pulse preceding the drive pulse is disclosed in the non-prepublished patent application Ser. No. 10/507,812, now U.S. Pat. No. 7,126,577. The further shaking pulse will not be present during the first display mode because no drive pulse is present. The use of the further shaking pulse improves the gray level reproduction.

In an embodiment in accordance with the invention as defined in claim 9, the drive circuit is arranged for generating during the second display mode a reset pulse which has an energy larger than required for the particles to reach one of the two extreme positions. The use of such a too long reset pulse is disclosed in the non-prepublished patent application Ser. No. 10/542,910. The use of the longer reset pulse than required improves the gray level reproduction. The use of over-reset is more relevant during the second image update period which occurs during the second display mode than during the first image update period which occurs during the first display mode.

In an embodiment in accordance with the invention as defined in claim 10, the drive circuit comprises a select driver, a data driver, and a controller. The controller controls in the first display mode, the select driver to select lines of pixels corresponding to the first area only, and the data driver to supply the first drive voltage waveforms to the selected ones of the pixels corresponding to the first area only. The controller controls in the second display mode, the select driver to select lines of pixels corresponding to the second area only or to both the first and the second area, and the data driver to supply the second drive voltage waveforms to the selected ones of the pixels corresponding to the second area only, or to the first and the second area.

During the addressing of the first area, only the optical states of the pixels of the first area may have to be changed. The refresh time or image update time will become smaller because only a subset of the select lines have to be selected and because optical states are selected for the pixels of the first area which require a maximum image update time which is shorter than the image update time required for pixels outside the first area.

In an embodiment in accordance with the invention as defined in claim 11, the matrix display comprises intersecting select electrodes and data electrodes, the pixels are associated with intersections of the select electrodes and the data electrodes. The controller controls in the first display mode, the select driver to supply select voltages to the select electrodes associated with the first area only, to select the associated lines of pixels one by one, and the data driver to supply the first drive voltage waveforms to the data electrodes associated with the first area only. The controller controls in the second display mode, the select driver to supply the select voltages to the select electrodes associated with the second area only, for selecting the associated lines of pixels one by one, and the data driver to supply the second drive voltage waveforms to the data electrodes associated with the second area only.

Thus, during the first display mode, the first area is addressed in the same manner as usually a complete display would be addressed. The difference is that only the select lines associated with the pixels of the first area are addressed one by one and that the data must be supplied only to the pixels of the first area to prevent that the optical state of the pixels of a selected line which pixels are not within the first area changes. In the same manner, during the second mode, only the pixels in the second area are addressed. This prevents that the pixels in the first area are addressed with the longer image update period required for the pixels of the second area.

The total sequence of fast updating of the image displayed in the first area and the slow updating of the image displayed in the second area will have the minimum duration possible if in the second mode only the pixels in the second area are selected.

It should be noted that it is possible that the first area is composed of several sub areas which form non-overlapping areas. For example, the first area comprises a first window in which the user is able to input characters, and a second window in which a list of words is shown which start with the input characters. In such an application, the second area preferably comprises all the pixels which are not in the first and second window. The second area may form background information.

In an embodiment in accordance with the invention as defined in claim 12 the first area comprises a rectangular window, and the controller receives at least coordinates of two opposite corners of the rectangular window. The controller determines from the coordinates, in the first display mode the select electrodes and the data electrodes which are associated with the first area, and in the second display mode, the select electrodes and the data electrodes which are associated with the second area.

In an embodiment in accordance with the invention as defined in claim 15, the display apparatus comprises an electrophoretic display which comprises a first and a second type of particles. The different types of particles are oppositely charged and have a first and a second color, respectively. The particles are arranged between first and second pixel electrodes. During the first display mode, the driver circuit supplies, between the first and second pixel electrodes, the first drive voltage waveform with an energy and polarity to attract the first type of particles towards the first pixel electrode and the second type of particles towards the second pixel electrode to obtain a first one of two extreme optical states showing the first color. Or, the driver circuit supplies between the first and second pixel electrodes the first drive voltage waveform with an energy and polarity to attract the second type of particles towards the first pixel electrode and the first type of particles towards the second pixel electrode to obtain the second one of the two extreme optical states showing the second color.

In an embodiment in accordance with the invention as defined in claim 16 the particles are white and black. Consequently, in this embodiment in accordance with the invention, the display is able to display a black and white image in the first area and a grey scale image in the second area. This is especially useful if the black and white image is text.

These and other aspects of the invention are apparent from and will be elucidated with reference to the embodiments described hereinafter.

Figure 2:
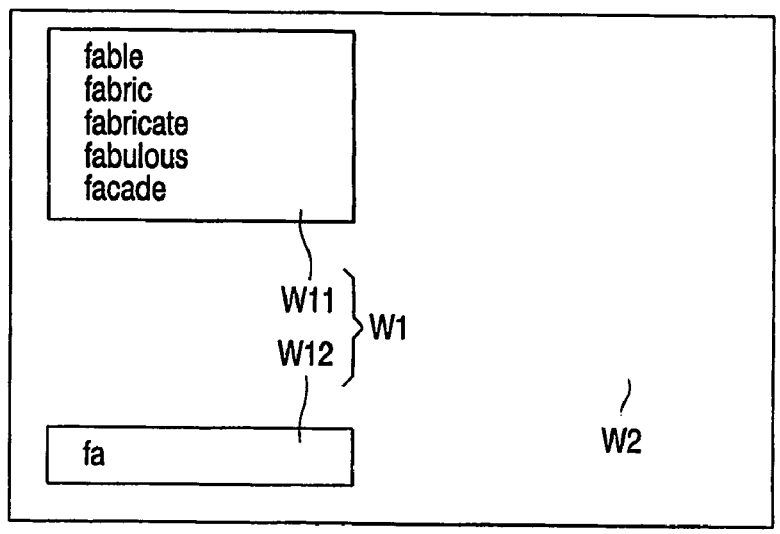
Figure 3A:
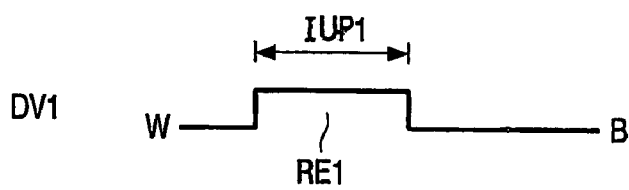
Figure 3B:
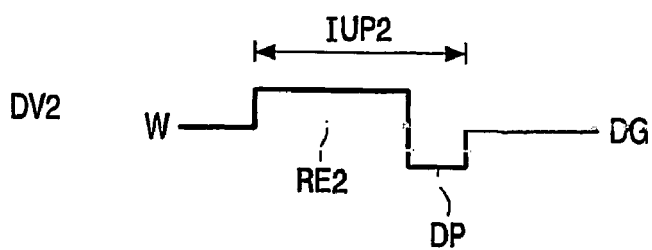
Figure 4:
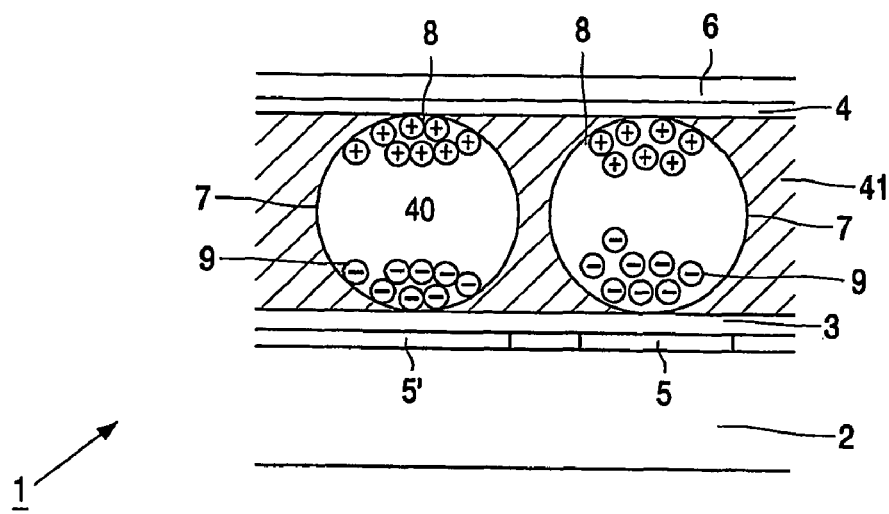
Figure 5:
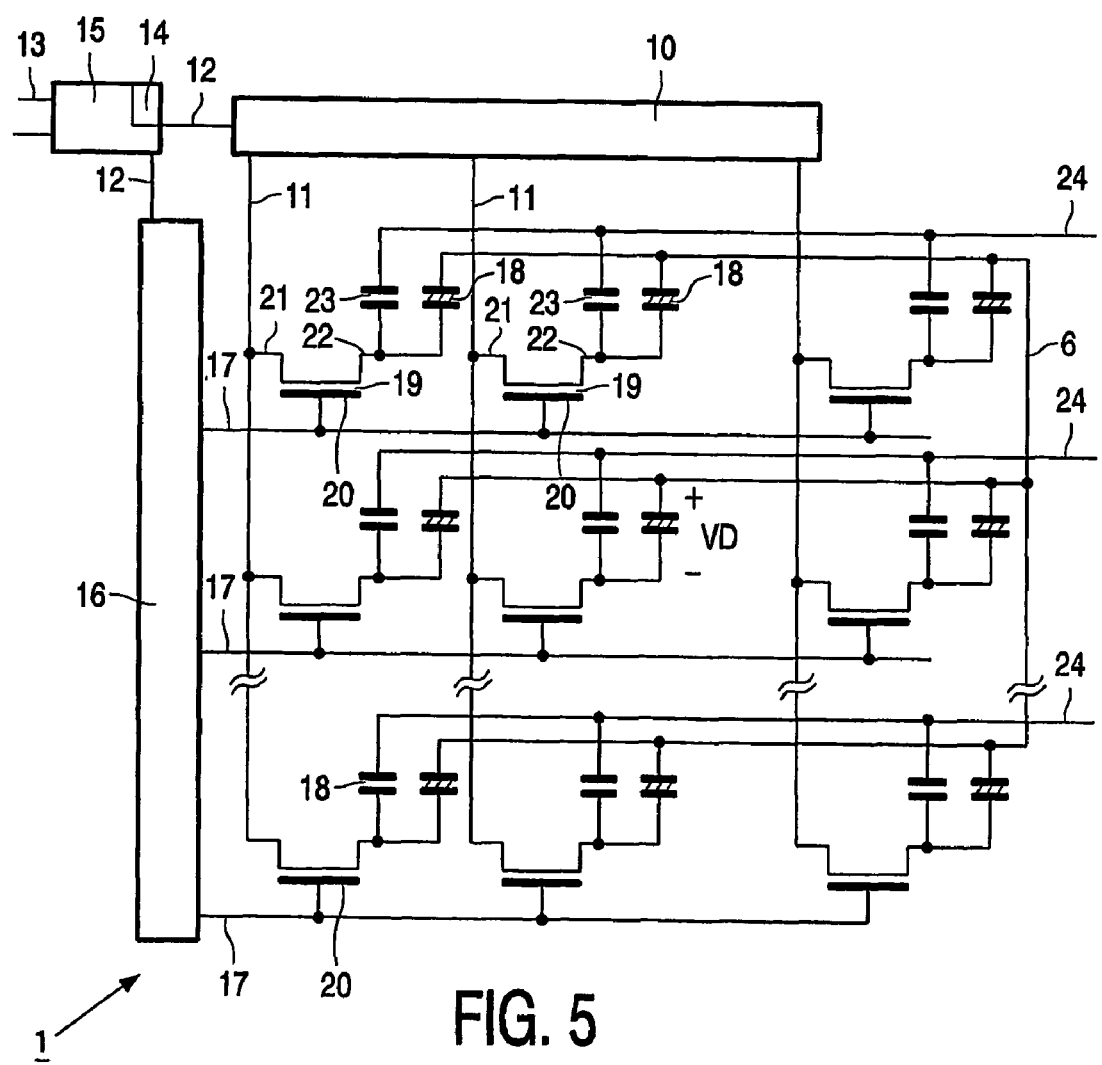
Figure 8A:
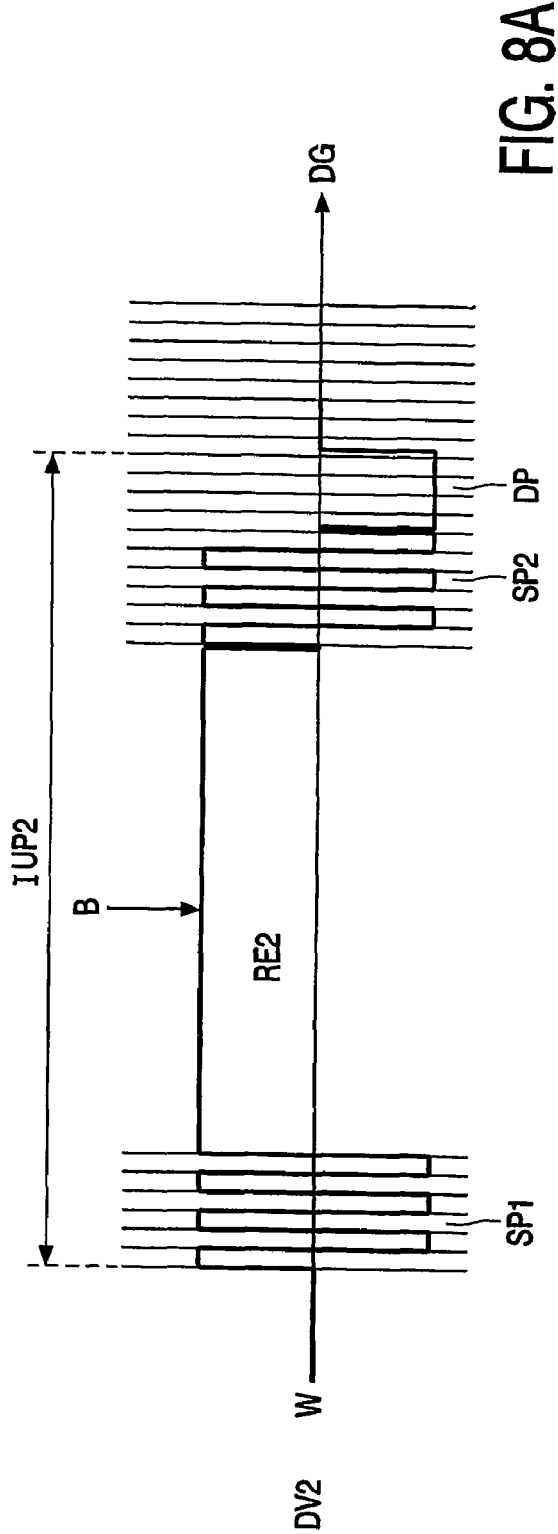
Figure 8B:
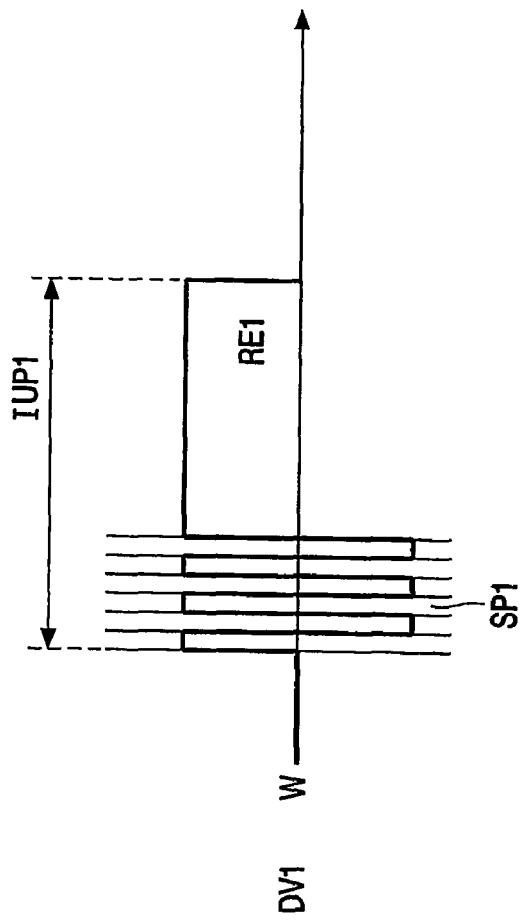
Figure 9:
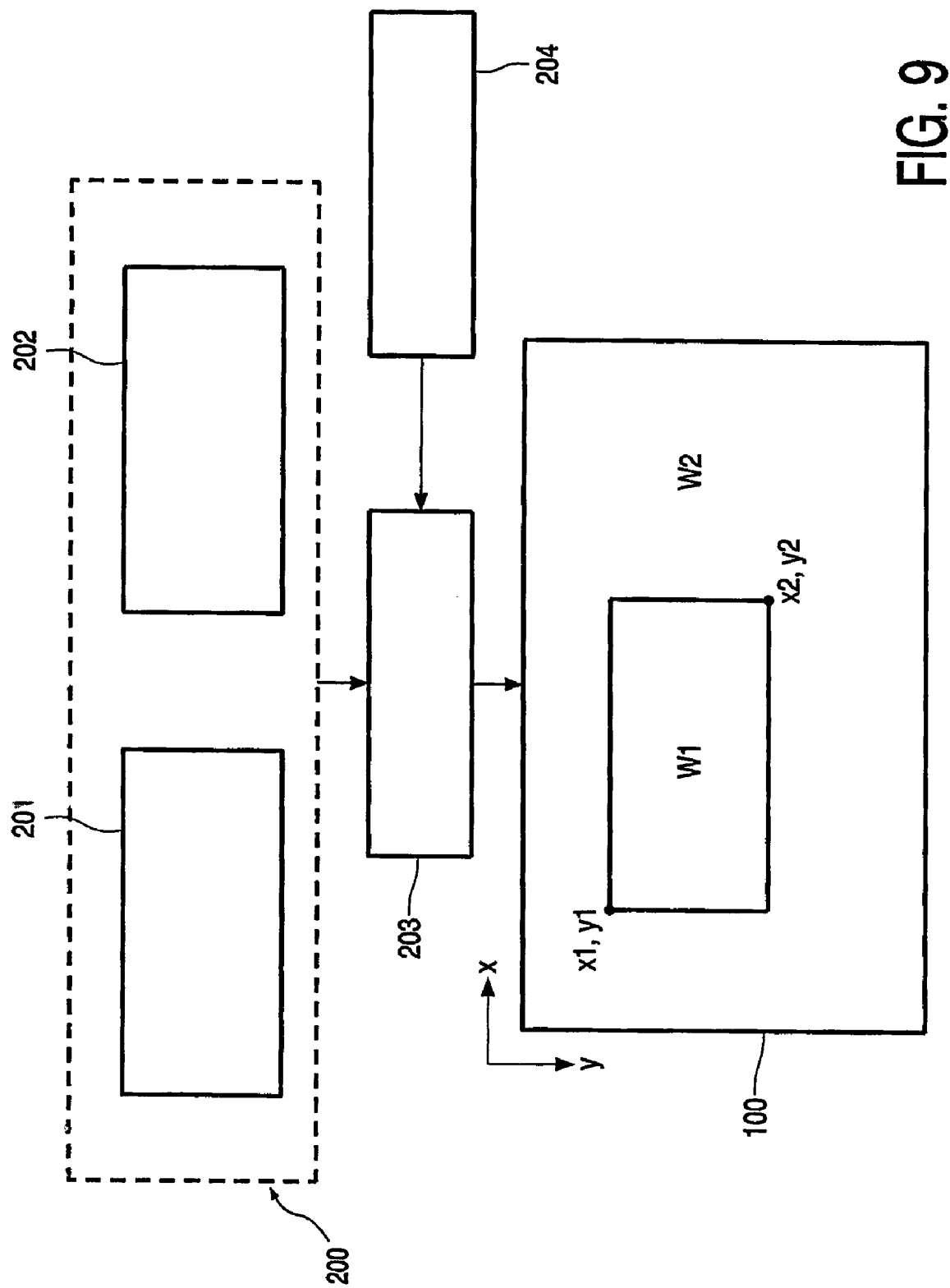

In the drawings:

FIG. 1 shows schematically a display apparatus with a driver and a bi-stable display, FIG. 2 shows different areas on the display screen, FIG. 3 shows drive voltages used for updating the first or the second area on the display screen in accordance with an embodiment of the invention, FIG. 4 shows diagrammatically a cross-section of a portion of an electrophoretic display, FIG. 5 shows diagrammatically a picture display apparatus with an equivalent circuit diagram of a portion of the electrophoretic display, FIG. 6 shows drive voltages for updating the second area on the display screen in accordance with an embodiment of the invention, FIG. 7 shows drive voltages for updating the second area on the display screen in accordance with an embodiment of the invention, FIG. 8 shows drive voltages used for updating the first or the second area on the display screen in accordance with an embodiment of the invention, and FIG. 9 shows a block diagram of a drive circuit for driving the bi-stable display.

In different Figures, the same references are used to indicate the same components or signals.

FIG. 1 shows schematically a display apparatus with a driver 101 and a bi-stable matrix display 100. The matrix display 100 comprises pixels 18 associated with intersections of the select electrodes 17 and date electrodes 11. Usually, the select electrodes 17 extend in the row direction and are also referred to as row electrodes and the data electrodes 11 extend in the column direction and are also referred to as column electrodes. Usually, the bi-stable matrix display 100 is an active matrix display comprising transistors which are controlled by select voltages on the select electrodes 17 to supply data voltages on the data electrodes 11 to the pixels 18 when a particular row of pixels 18 is selected. FIG. 1 indicates a first area W1 on the display screen of the matrix display 100 and a second area W2 on the display screen. By way of example only, the first area W1 is a rectangular window and the second area W2 comprises all the pixels 18 which are not within the window W1.

Usually the optical state of the pixels 18 of the complete display 100 is updated during an image update period (IUP1, IUP2, see FIG. 3). During an image update period, the rows of pixels 18 are selected one by one. The driver circuit 101 supplies to the select electrodes 17 select voltages. The select voltage supplied to the selected row of pixels 18 has a level to cause the transistors associated with the selected row of pixels 18 to conduct. The select voltages supplied to the non-selected rows of pixels 18 have a level such that the transistors associated with the non-selected rows of pixels 18 have a high impedance. The driver circuit 101 further supplies drive voltage waveforms to the pixels 18 of the selected row in parallel via the data electrodes 11.

Usually, the drive voltage waveform for a particular pixel 18 depends on the optical transition to be made by this pixel 18. Especially, the duration of the drive voltage waveform may differ for different optical transitions. This is illustrated for a bi-stable display with respect to FIG. 3 and for an electrophoretic display with respect to FIGS. 6 and 7. Because usually all the pixels 18 of the display 100 have to be updated, and because the optical transition of each pixel 18 is arbitrary, the image update period is determined by the longest image update period.

If only a group of the pixels 18 associated with a sub-area W1 of the display 101 has to be updated and the information to be displayed in this sub-area W1 does not use optical transitions which require the longest image update period, it is possible to update the image within the sub-area W1 with an image update period shorter than the longest image update period. Consequently, the refresh rate of the information displayed in the sub-area is higher than would be possible if the longest image update period was used.

FIG. 2 shows different areas on the display screen. The first area W1 now comprises two areas W11 and W12. The second area W2 covers the area of the display screen not covered by the first area W11, W12. The area W12 is a rectangular area showing a sequence of characters inputted by the user. In this example, the user inputted the string fa. The area W11 is a rectangular area showing a listing of words starting with the string fa. The area W2 shows background information, which is, for example, a comedy book page with grey pictures and text consisting the word "fabulous", which is not known for the user. The user starts typing fa in W12 and more words starting with fa are listed in W11. The areas W11 and W12 need not be rectangular, but this will complicate the addressing of the pixels 18 of the areas.

By way of example, the information in the areas or windows W11 and W12 is displayed in black and white which are the extreme optical states of the display device 101. The information in the area W2 is displayed with grayscales. The grayscales usually include the two extreme optical states black and white and at least one intermediate (grey) state.

The required image update periods IUP1, IUP2 for updating the information in the windows W11, W12 and for updating the information in the window W2, respectively, are elucidated with respect to FIG. 3.

FIG. 3 shows drive voltages used for updating the first or the second area on the display screen in accordance with an embodiment of the invention.

FIG. 3A shows a drive voltage waveform DV1 required to change the optical state of a pixel 18 from substantially white W to substantially black B. The drive voltage waveform DV1 comprises a reset pulse RE1. The reset pulse RE1 may have a duration just sufficient to guarantee that, at the end of the reset pulse RE1, the pixel 18 is in the extreme optical state black B. The reset pulse RE1 may have a longer duration than this minimally required duration to obtain an over-reset.

FIG. 3B shows a drive voltage waveform DV2 required to change the optical state of a pixel 18 from substantially white W to an intermediate state dark grey DG. This drive voltage waveform DV2 comprises a reset pulse RE2 preceding a drive pulse DP. The reset pulse RE2 may be equal to the reset pulse RE1 and changes the optical state of the pixel 18 into substantially black B. The drive pulse DP changes the optical state from the well defined substantially black B to dark grey DG.

If in the area W2 of the display screen the optical states of the pixels 18 should be able to change both from substantially white W to substantially black B, and from substantially white W to dark grey DG, the image update period IUP2 during the second display mode is determined by the drive voltage waveform DV1, DV2 with the longest duration. Thus the image update period will be IUP2 which has the duration of the reset pulse RE2 and the grey drive pulse DP (also referred to as drive pulse DP) together.

If in the areas W11 and W12 of the display screen the optical states of the pixels 18 only need to change to substantially black the image update period IUP1 during the first display mode is determined by the drive voltage waveform DV1. Thus the image update period will be IUP1 which has the duration of the reset pulse RE1 only.

Consequently, if only the image in the areas W11 and W12 is refreshed the image update period is IUP1 which is shorter than the image update period IUP2 required in the area W2. It is thus possible to refresh the information in the areas W11 and W12 at a relatively high rate with respect to the refresh rate of the information in the area W2. In the application shown by way of example in FIG. 2, it is better possible to keep track with the input of the user.

Usually, the drive voltage waveform DV2 required to reach an intermediate grey level with high accuracy is more complex than shown in FIG. 3B. Such drive voltage waveforms DV2 are shown for an electrophoretic display in FIGS. 6 and 7. Especially if these complex waveforms are used to obtain intermediate grey levels during the second display mode, the image update period may become significantly shorter if only the two extreme optical states are used during the first display mode.

It is also possible to use another subset of the optical state transitions than the two extreme optical states to decrease the image update period for information which may be displayed with such a subset of the optical state transitions. What is relevant is that the duration of the drive voltage waveforms DV1 required for the subset of the optical state transitions which have to occur within the first area W11, W12 have a duration which is shorter than the duration required for the drive voltage waveform DV2 for an optical state transition not in the subset and which optical state may occur within the second area W2.

FIG. 4 shows diagrammatically a cross-section of a portion of an electrophoretic display, which for example, to increase clarity, has the size of a few display elements only. The electrophoretic display comprises a base substrate 2, an electrophoretic film with an electronic ink which is present between two transparent substrates 3 and 4 which, for example, are of polyethylene. One of the substrates 3 is provided with transparent pixel electrodes 5, 5' and the other substrate 4 with a transparent counter electrode 6. The counter electrode 6 may also be segmented. The electronic ink comprises multiple microcapsules 7 of about 10 to 50 microns. Each microcapsule 7 comprises positively charged white particles 8 and negatively charged black particles 9 suspended in a fluid 40. The dashed material 41 is a polymer binder. The layer 3 is not necessary, or could be a glue layer. When the pixel voltage VD across the pixel 18 (see FIG. 1) is supplied as a positive drive voltage Vdr (see, for example, FIG. 3) to the pixel electrodes 5, 5' with respect to the counter electrode 6, an electric field is generated which moves the white particles 8 to the side of the microcapsule 7 directed to the counter electrode 6 and the display element will appear white to a viewer. Simultaneously, the black particles 9 move to the opposite side of the microcapsule 7 where they are hidden from the viewer. By applying a negative drive voltage Vdr between the pixel electrodes 5, 5' and the counter electrode 6, the black particles 9 move to the side of the microcapsule 7 directed to the counter electrode 6, and the display element will appear dark to a viewer (not shown). When the electric field is removed, the particles 8,9 remain in the acquired state and thus the display exhibits a bi-stable character and consumes substantially no power. Electrophoretic media are known per se from e.g. U.S. Pat. No. 5,961,804, U.S. Pat. No. 6,120,839 and U.S. Pat. No. 6,130,774 and may be obtained from E-ink Corporation.

FIG. 5 shows diagrammatically a picture display apparatus with an equivalent circuit diagram of a portion of the electrophoretic display. The picture display device 1 comprises an electrophoretic film laminated on the base substrate 2 provided with active switching elements 19, a row driver 16 and a column driver 10. Preferably, the counter electrode 6 is provided on the film comprising the encapsulated electrophoretic ink, but, the counter electrode 6 could be alternatively provided on a base substrate if a display operates based on using in-plane electric fields. Usually, the active switching elements 19 are thin-film transistors TFT. The display device 1 comprises a matrix of display elements associated with intersections of row or select electrodes 17 and column or data electrodes 11. The row driver 16 consecutively selects the row electrodes 17, while the column driver 10 provides data signals in parallel to the column electrodes 11 to the pixels associated with the selected row electrode 17. Preferably, a processor 15 firstly processes incoming data 13 into the data signals to be supplied by the column electrodes 11.

The drive lines 12 carry signals which control the mutual synchronisation between the column driver 10 and the row driver 16.

The row driver 16 supplies an appropriate select pulse to the gates of the TFT's 19 which are connected to the particular row electrode 17 to obtain a low impedance main current path of the associated TFT's 19. The gates of the TFT's 19 which are connected to the other row electrodes 17 receive a voltage such that their main current paths have a high impedance. The low impedance between the source electrodes 21 and the drain electrodes of the TFT's allows the data voltages present at the column electrodes 11 to be supplied to the drain electrodes which are connected to the pixel electrodes 22 of the pixels 18. In this manner, a data signal present at the column electrode 11 is transferred to the pixel electrode 22 of the pixel or display element 18 coupled to the drain electrode of the TFT if the TFT is selected by an appropriate level on its gate. In the embodiment shown, the display device of FIG. 1 also comprises an additional capacitor 23 at the location of each display element 18. This additional capacitor 23 is connected between the pixel electrode 22 and one or more storage capacitor lines 24. Instead of TFTs, other switching elements can be used, such as diodes, MIMs, etc.

Figures 6A, 6B:
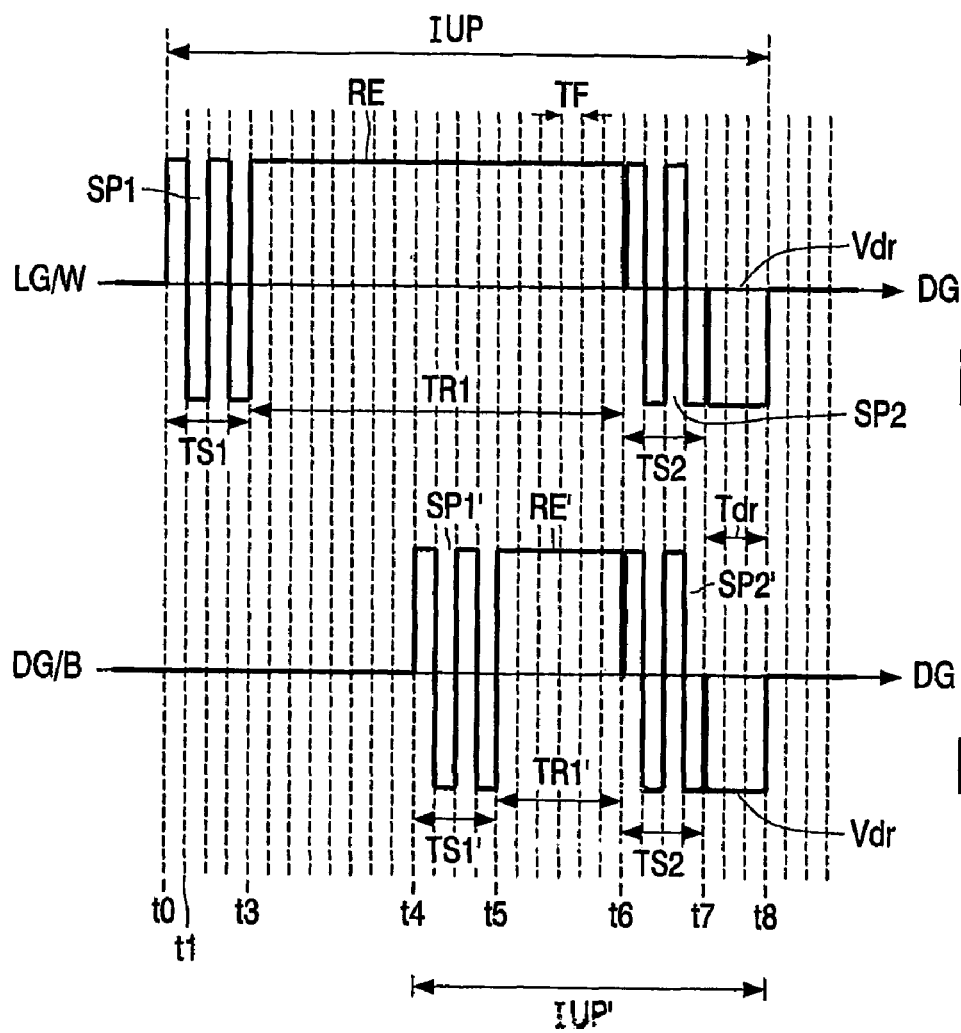

FIG. 6 shows drive voltage waveforms across a pixel in different situations wherein over-reset is used. By way of example, FIG. 6 are based on an electrophoretic display with black and white particles and four optical states: black B, dark grey DG, light grey LG, white W. FIG. 6A shows an image update period IUP for a transition from light grey LG or white W to dark grey DG. FIG. 6B shows an image update period IUP for a transition from dark grey DG or black B to dark grey DG. The vertical dotted lines represent the frame periods TF (which usually last 20 milliseconds), the line periods occurring within the frame periods TF are not shown. Usually, within one frame period TF all the rows of pixels 18 are selected one by one.

In both FIG. 6A and FIG. 6B, the pixel voltage VD across a pixel 18 comprises successively first shaking pulses SP1, SP1', a reset pulse RE, RE', second shaking pulses SP2, SP2' and a drive pulse Vdr. The drive pulses Vdr occur during the same drive period TD which lasts from instant t7 to instant t8. The second shaking pulses SP2, SP2' immediately precede the driving pulses Vdr and thus occur during a same second shaking period TS2. The reset pulse RE, RE' immediately precede the second shaking pulses SP2, SP2'. However, due to the different duration TR1, TR1' of the reset pulses RE, RE', respectively, the starting instants t3 and t5 of the reset pulses RE, RE' are different. The first shaking pulses SP1, SP1' which immediately precede the reset pulses RE, RE', respectively, thus occur during different first shaking periods in time TS1, TS1', respectively.

The second shaking pulses SP2, SP2' occur for every pixel 18 during a same second shaking period TS2. This will cause a lower power consumption if the usual row at a select addressing is applied. But, alternatively this enables to select the duration of this second shaking period TS2 much shorter as shown in FIGS. 6A and 6B. For clarity, each one of levels of the second shaking pulses SP2, SP2' is present during a frame period TF. In fact, in accordance with the invention, now, during the second shaking period TS2, the same voltage levels can be supplied to all the pixels 18. Thus, instead of selecting the pixels 18 line by line, it is now possible to select all the pixels 18 at once, and only a single line select period TL (see FIG. 7) suffices per level. Thus, the second shaking period TS2 only needs to last four line periods TL instead of four standard frame periods TF.

Alternatively, it is also possible to change the timing of the drive signals such that the first shaking pulses SP1 and SP1' are aligned in time, the second shaking pulses SP2 are then no longer aligned in time (not shown). Now, either the power consumption decreases because of the aligned first shaking pulses SP1 and SP1', or the first shaking period TS1 can be much shorter. The power efficiency increases maximally if both the first shaking pulses SP1 and SP1' and the second shaking pulses SP2 are aligned in time as is shown in FIG. 7.

The driving pulses Vdr are shown to have a constant duration, however, the drive pulses Vdr may have a variable duration.

If the drive method shown in FIGS. 6A and 6B is applied to the electrophoretic display, outside the second shaking period TS2, the pixels 18 have to be selected line by line by activating the switches 19 line by line. The voltages VD across the pixels 18 of the selected line are supplied via the column electrodes 11 in accordance with the optical state the pixel 18 should have. For example, for a pixel 18 in a selected row of which pixel the optical state has to change from white W to dark grey DG, a positive voltage has to be supplied at the associated column electrode 11 during the frame period TF starting at instant t0. For a pixel 18 in the selected row of which pixel the optical state has to change from black B to dark grey DG, a zero voltage has to be supplied at the associated column electrode during the frame period TF lasting from instants t0 to t1.

It is assumed that all optical states (black B, dark grey DG, light grey LG, white W) may occur during the second display mode when the optical states of the pixels 18 in the second area W2 are updated. Consequently, the image update period IUP2 during the second display mode is determined by the drive voltage waveform with the longest duration. The drive voltage waveform with the longest duration is shown in FIG. 6A. If during the first display mode when the optical state of the pixels 18 in the first area are updated it is not required to be able to make the transition from white W or light grey LG to dark grey DG, the image update period will not be determined by the relatively long image update period IUP shown in FIG. 6A. For example, if only the optical states black B and dark grey are used, the image update period will be determined by the duration IUP' of the drive voltage waveform shown in FIG. 6B which is much shorter than the duration IUP of the drive voltage waveform shown in FIG. 6A. Consequently, the refresh rate of the information displayed in the first area W1 is much higher than the refresh rate of the information displayed in the second area W2.

FIG. 7 shows drive voltages for updating the second area on the display screen in accordance with an embodiment of the invention. FIG. 7 show drive waveforms for all optical transitions to dark grey DG if the drive voltages VD across a pixel 18 comprise shaking periods SP1, SP2 which occur during the same time periods and no over-reset is used. Alternatively, over-reset may be used, or drive voltage waveforms may be used in which the end of the first shaking pulses SP1 and the start of the reset pulses RE substantially coincide, in the same manner as shown in FIG. 6. In the latter case, the duration of the image update period IUP will be dependent on the optical transition and it will not be possible to align both the shaking pulses SP1 and the shaking pulses SP2 in drive waveforms for different optical state transitions.

The use of both a shaking pulse SP1 preceding the reset pulse RE and a shaking pulse SP2 in-between the reset pulse RE and the drive pulse DP improves the reproducibility of grayscales. The grayscales will be less influenced by the history of the drive voltage. The alignment of the shaking pulses SP1 and SP2 such that they occur at the same time during each image update period IUP2 independent on the optical transition required has the advantage that the power efficiency increases. This, because it is possible, for each preset pulse of the shaking pulse SP1, SP2 to select all the lines of pixels 18 simultaneously and to supply the same data signal level to all the pixels 18. The effect of capacitances between pixels 18 and electrodes 11, 17 will decrease. Further, as all the pixels 18 may be selected simultaneously, the duration of the preset pulses of the shaking pulse SP1, SP2 may become much shorter than the standard frame period TF thus shortening the image update period IUP2. This is disclosed in more detail in the non-prepublished patent application Ser. No. 10/515,686 which has been filed as patent application IB03/01983 (WO).

Figures 7A, 7B, 7C, 7D:
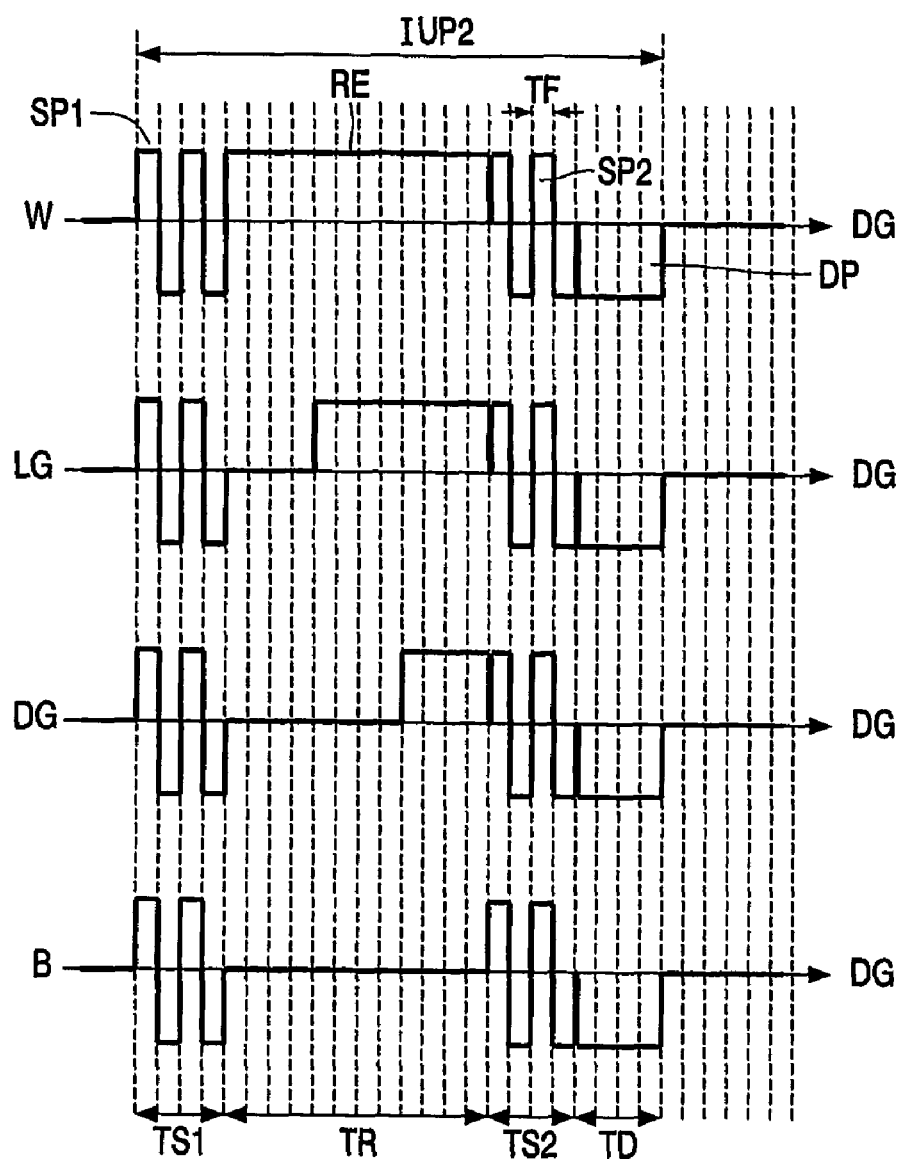

FIG. 7A shows a waveform required to change the optical state of the pixel 18 from white W to dark grey DG. FIG. 7B shows a waveform required to change the optical state of the pixel 18 from light grey LG to dark grey DG. FIG. 7C shows a waveform required to keep the optical state of the pixel 18 dark grey DG. FIG. 7D shows a waveform required to change the optical state of the pixel 18 from black B to dark grey DG. For other transitions similar drive waveforms are required. For example, for the transition from white W to black B, portions of the waveform of FIG. 7A can be used, but with DP=0V.

In all FIG. 7, the first shaking pulses SP1 occur during the same first shaking period TS1, the second shaking pulses SP2 occur during the same second shaking period TS2, and the driving pulse DP occurs during the same drive period TD. The driving pulses DP may have different durations. The reset pulse RE has a length which depends on the optical transition of the pixel 18. For example, in a pulse width modulated driving, the full reset pulse width TR is required for resetting the pixels 18 from white W to black B or white W to dark grey DG, see FIG. 7A. For resetting the pixels 18 from light grey LG to black B or from light grey LG to dark grey DG, only ⅔ of the duration of this full reset pulse width TR is required, see FIG. 7B. For resetting the pixels 18 from dark grey DG to black B or to dark grey DG, only ⅓ of the duration of this full reset pulse width TR is required, see FIG. 7C. For resetting the pixels 18 from black B to dark grey DG, no reset pulse RE is required, see FIG. 7D.

These waveforms are also useful when the known transition matrix based driving methods are used in which previous images are considered in determining the impulses (time× voltage) for a next image. Alternatively, these waveforms are also useful when the electrophoretic material used in the display is less sensitive to the image history and/or dwell time.

Thus, to conclude, independent of the duration of the reset pulse RE, the first shaking pulses SP1 and the second shaking pulses SP2 can be supplied to all the pixels 18 simultaneously, which has the advantages mentioned before.

It has to be noted that in such a display which is able to display the optical states black B, dark grey DG, light grey LG and white W, the image update period IUP2 has always the same duration. However, in such a display apparatus which is optimized to display accurate grey levels the image update period IUP2 is relatively long. The present invention is based on the insight that if on a particular sub-area W11, W12 of the display screen information is displayed for which it is not required to use all the available optical states it is possible to select states which require a shorter image update period IUP1.

For example, if still a high accuracy of the optical states in the sub-area W11, W12 is required, preferably, only the states black B and white W are selected. In the sub-area W11, W12 now the drive voltage waveform DV1 shown in FIG. 8B may be used. For image updates in the area W2 the much longer lasting voltage waveforms shown in FIG. 7 are used.

FIG. 8 shows drive voltages used for updating the first or the second area on the display screen in accordance with an embodiment of the invention.

FIG. 8A shows a drive voltage waveform DV2 which is identical to the drive voltage waveform shown in FIG. 7A with over-reset. The vertical arrow indicated by B indicates the instant when the optical state black B is reached. The reset pulse to the right hand side of this arrow indicates the over-reset. The total duration of this waveform DV2 is IUP2. The drive voltage waveforms for other optical transitions may be identical to the waveforms shown in FIG. 6 or 7.

FIG. 8B shows a drive voltage waveform DV1 which comprises a shaking pulse SP1 preceding a reset pulse RE1. The total duration of this waveform DV1 is IUP1.

If an optimal performance of display of the grayscales is required in the second area W2, in this area W2 the drive voltage waveforms shown in FIG. 6, 7 or 8A have to be used. The image update period will be determined by the drive voltage waveform which has the longest duration and thus is equal to IUP2. If the waveforms of FIG. 7 are used all the waveforms have a duration IUP2 and thus the image update period is IUP2. If the waveforms of FIG. 6 (no over-reset) or the waveforms based on over-reset shown in FIG. 8A are used, the duration of all the waveforms is IUP (no over-reset) or IUP2 (over-reset), respectively. Consequently, the image update periods are IUP and IUP2, respectively. If the waveforms are used in which the non used time between the shaking pulses SP1 and the reset pulse RE1 is eliminated (as shown in FIG. 6), the drive voltage waveforms have different durations for different optical transitions. But, still the image update periods are IUP and IUP2, respectively, as the longest waveform determines the image update period to be used.

If in the first area W11, W12 only black B and white W have to be displayed, the drive voltage waveform DV1 shown in FIG. 8B can be used, and the image update period is IUP1 which is much shorter than the image update periods IUP or IUP2. The waveform DV1 does not require the drive pulse DP and the shaking pulse SP2 preceding the drive pulse DP. Further, if, preferably, the waveforms DV2 for reaching intermediate optical states comprise an over-reset, no over-reset is required for the transition to black B. It is even possible to omit the shaking pulse SP1 in FIG. 8B as was already shown in FIG. 3A.

To conclude, if only the information in the first area W11, W12 is updated, a relatively short image update period IUP1 can be used because this information can be displayed with a sub-set of the optical states which are selected such that the drive voltage waveforms DV1 do not have the maximum duration. If the information in the second area W2 is updated, optical states which require for their transitions long drive voltage waveforms need to be available. Consequently, the image update period will be relatively large.

In the most practical embodiment in accordance with the invention, only the the extreme optical states are required during the image updates in the first area W1, and all the optical states are available for the information to be displayed in the second area W2. The two extreme optical states can be obtained with a high accuracy with relatively short drive voltage waveforms, while the intermediate optical states which may be used in the second area require relatively long drive voltage waveforms to reach a practically usable accuracy of the grayscales.

FIG. 9 shows a block diagram of a drive circuit for driving the bi-stable display. The controller/driver 203 receives information on grayscale drive voltage waveforms 201 and the black and white drive voltage waveform 202 as stored in a table look up memory 200. The controller/driver 203 further receives the coordinates x1, y1 and x2, y2 of two opposing corners of the window W1 on the display screen of the display device 100. The window W1 is the first area, the second area W2 comprises the pixels not within the first area W1.

In the first display mode when only the pixels 18 of the first area W1 are updated, the controller/driver 203 selects the rows of pixels 18 within the first area W1 one by one while the black and white drive voltage waveforms 202 are supplied via the column electrodes 11 to the pixels 18 within the first area W1 only to prevent a change of the optical state of pixels 18 outside the first area W1.

In the second display mode when only the pixels 18 of the second area W2 are updated, the controller/driver 203 selects the rows of pixels 18 within the second area W2 one by one while the grayscale drive voltage waveforms 201 are supplied via the column electrodes 11 to the pixels 18 within the second area W2 only to prevent a change of the optical state of pixels 18 outside the second area W2.

In the example shown in FIG. 9, during the first display mode the rows of pixels between the vertical coordinates y1 and y2 are selected, while during the second display mode all the rows have to be selected.

It should be noted that the above-mentioned embodiments illustrate rather than limit the invention, and that those skilled in the art will be able to design many alternative embodiments without departing from the scope of the appended claims. Although, the embodiments are illustrated in more detail with respect to electrophoretic displays, the same approach may be valid for other bi-stable displays.

In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. A drive circuit (101) for driving a bi-stable matrix display device having a display screen (100) comprising a matrix of pixels (18),
   in a first display mode, the drive circuit (101) is arranged for generating during first image update periods (IUP1) first drive voltage waveforms (DV1) to allow a first set of optical states, and to supply the first drive voltage waveforms (DV1) to a first subset of the pixels (18) covering a first area (W1) of the display screen (100) only,
   in a second display mode, the drive circuit (101) is arranged for generating during second image update periods (IUP2) second drive voltage waveforms (DV2) to allow a second set of optical states, and to supply the second drive voltage waveforms (DV2) to a second subset of the pixels covering a second area (W2) of the display screen (100), wherein the optical states of the first set of optical states and of the second set of optical states are selected to obtain first image update periods (IUP1) being shorter than the second image update periods (IUP2).

2. A drive circuit (101) as claimed in claim 1, wherein in the first display mode, the drive circuit (100) is arranged for generating during the first image update periods (IUP1) the first drive voltage waveforms (DV1) to obtain two extreme optical states only.

3. A drive circuit (101) as claimed in claim 1, wherein in a second display mode, the drive circuit (101) is arranged for generating during the second image update periods (IUP2) the second drive voltage waveforms (DV2) to display an image having at least one optical state in-between the two extreme optical states, wherein at least one of the second drive voltage waveforms (DV2) comprises a grey drive pulse (DP) which is not present during the first image update periods (IUP1).

4. A drive circuit (101) as claimed in claim 2, wherein in a second display mode, the drive circuit (101) is arranged for generating during the second image update periods (IUP2) the second drive voltage waveforms (DV2) to display an image having at least one optical state in-between the two extreme optical states, wherein at least one of the second drive voltage waveforms (DV2) comprises a grey drive pulse (DP) which is not present during the first image update periods (IUP1).

5. A drive circuit (101) as claimed in claim 1, wherein the drive circuit (101) is arranged for driving a bi-stable matrix display, wherein the bi-stable display (101) is an electrophoretic display.

6. A drive circuit (101) as claimed in claim 4, wherein the drive circuit (101) is arranged for driving an electrophoretic display comprising microcapsules (7) with at least two types of different particles (8, 9), and for generating:
   during the first display mode the first image update periods (IUP1) comprising a reset pulse (RE) only, wherein the reset pulse (RE1) has an energy enabling said particles (8, 9) to substantially occupy one of two limit positions corresponding to one of the extreme optical states,
   during the second display mode at least one of the second image update periods (IUP2) comprising successively at least a reset pulse (RE2) and a grey drive pulse (DP), wherein the grey drive pulse (DP) determines the optical state of the pixels (18).

7. A drive circuit (101) as claimed in claim 4, wherein the drive circuit (101) is arranged for generating a shaking pulse (SP1) preceding the reset pulse (RE1, RE2) during the second image update period (IUP2) or during both the first and the second image update period (IUP1, IUP2), the shaking pulse (SP1) comprising at least one preset pulse having an energy sufficient to release the particles (8, 9) present in one of the limit positions corresponding to one of the extreme optical states but insufficient to enable said particles (8, 9) to reach the other one of the limit positions corresponding the other one of the extreme optical states.

8. A drive circuit (101) as claimed in claim 6, wherein the drive circuit (101) is arranged for generating during the second display mode a further shaking pulse (SP2) occurring in-between the reset pulse (RE2) and the drive pulse (DP).

9. A drive circuit (101) as claimed in claim 6, wherein the drive circuit (101) is arranged for generating during the second display mode a further reset pulse (REF) succeeding the first mentioned reset pulse (RE2) to obtain an over reset pulse having an energy larger than required for the particles (8, 9) to reach one of the extreme positions.

10. A drive circuit (101) as claimed in claim 2, wherein the drive circuit (101) comprises a select driver (16), a data driver (10), and a controller (15) for controlling
in the first display mode, the select driver (16) to select lines of pixels (18) corresponding to the first area (W1) only, and the data driver (10) to supply the first drive voltage waveforms (DV1) to the selected ones of the pixels (18) corresponding to the first area (W1) only, and
in the second display mode, the select driver (16) to select lines of pixels (18) corresponding to the second area (W2) only or to the first and the second area (W1, W2), and the data driver (10) to supply the second drive voltage waveforms (DV2) to the selected ones of the pixels (18) corresponding to the second area (W2) only or to the first and the second area (W1, W2).

11. A drive circuit (101) as claimed in claim 10, wherein the matrix display (100) comprises intersecting select electrodes (17) and data electrodes (11), the pixels (18) being associated with intersections of the select electrodes (17) and the data electrodes (11), the controller (15) being arranged for controlling
in the first display mode, the select driver (16) to supply select voltages to the select electrodes (17) associated with the first area (W1) only, for selecting the associated lines of pixels (18) one by one, and the data driver (10) to supply the first drive voltage waveforms (DV1) to the data electrodes (11) associated with the first area (W1) only, and
in the second display mode, the select driver (16) to supply the select voltages to the select electrodes (17) associated with the second area (W2) only, for selecting the associated lines of pixels (18) one by one, and the data driver (10) to supply the second drive voltage waveforms (DV2) to the data electrodes (11) associated with the second area (W2) only.

12. A drive circuit (101) as claimed in claim 11, wherein the first area (W1) comprises a rectangular window, and the controller (15) is arranged to receive at least coordinates (x1, y1, x2, y2) of two opposite corners of the rectangular window to determine
in the first display mode, the select electrodes (17) and the data electrodes (11) being associated with the first area (W1), and
in the second display mode, the select electrodes (17) and the data electrodes (11) being associated with the second area (W2).

13. A display apparatus comprising a bi-stable matrix display device (100) and a drive circuit (101) as claimed in claim 1.

14. A display apparatus as claimed in claim 13, wherein the bi-stable display (101) is an electrophoretic display.

15. A display apparatus as claimed in claim 13, wherein the electrophoretic display comprises a first and a second type of particles (8, 9) having opposite charges and a first and a second color, respectively, said particles (8, 9) being arranged between first and second pixel electrodes (6, 5, 5'), during the first display mode, the driver circuit (101) is arranged for supplying between the first and second pixel electrodes (6, 5, 5') the first drive voltage waveform (DV1) having an energy and polarity to attract the first type of particles (8) towards the first pixel electrode (6) and the second type of particles (9) towards the second pixel electrode (5, 5') to obtain a first one of two extreme optical states showing the first color, or for supplying between the first and second pixel electrodes (6, 5, 5') the first drive voltage waveform (DV1) having an energy and polarity to attract the second type of particles (9) towards the first pixel electrode (6) and the first type of particles (9) towards the second pixel electrode (5, 5') to obtain a second one of the two extreme optical states showing the second color.

16. A display apparatus as claimed in claim 15, wherein the first color is black and the second color is white.

17. A method of driving a bi-stable matrix display having a display screen (100) comprising a matrix of pixels (18),
in a first display mode, the method comprises generating (101) during first image update periods (IUP1) first drive voltage waveforms (DV1) to allow a first set of optical states, and supplying (101) the first drive voltage waveforms (DV1) to a first subset of the pixels (18) covering a first area (W1) of the display screen (100) only,
in a second display mode, the method comprises generating (101) during second image update periods (IUP2) second drive voltage waveforms (DV2) to allow a second set of optical states, and supplying (101) the second drive voltage waveforms (DV2) to a second subset of the pixels covering a second area (W2) of the display screen (100), wherein the optical states of the first set of optical states and of the second set of optical states are selected to obtain first image update periods (IUP1) being shorter than the second image update periods (IUP2).

* * * * *